US011100217B1

(12) United States Patent
Natanzon et al.

(10) Patent No.: US 11,100,217 B1
(45) Date of Patent: Aug. 24, 2021

(54) LEVERAGING A DISASTER RECOVERY INFRASTRUCTURE TO PROACTIVELY MANAGE CYBER SECURITY THREATS TO A PRODUCTION ENVIRONMENT

(71) Applicant: EMC IP Holding Company LLC, Hopkinton, MA (US)

(72) Inventors: Assaf Natanzon, Tel Aviv (IL); David Zlotnick, Tel Aviv (IL); Boris Shpilyuck, Ashdod (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 413 days.

(21) Appl. No.: 16/250,853

(22) Filed: Jan. 17, 2019

(51) Int. Cl.
*G06F 21/53* (2013.01)
*H04L 29/06* (2006.01)
*G06F 11/14* (2006.01)
*H04L 12/24* (2006.01)
*H04L 29/08* (2006.01)
*G06F 9/455* (2018.01)

(52) U.S. Cl.
CPC .......... *G06F 21/53* (2013.01); *G06F 9/45558* (2013.01); *G06F 11/1464* (2013.01); *G06F 11/1484* (2013.01); *H04L 41/0816* (2013.01); *H04L 41/0869* (2013.01); *H04L 63/10* (2013.01); *H04L 63/1416* (2013.01); *H04L 63/1433* (2013.01); *H04L 63/1441* (2013.01); *H04L 67/34* (2013.01); *G06F 2009/45562* (2013.01)

(58) Field of Classification Search
CPC .. G06F 21/53; G06F 9/45558; G06F 11/1464; G06F 11/1484; H04L 41/0816; H04L 41/0869; H04L 63/10; H04L 63/1416; H04L 63/1433; H04L 63/1441; H04L 67/34
See application file for complete search history.

(56) References Cited

U.S. PATENT DOCUMENTS

| | | | | |
|---|---|---|---|---|
| 7,437,764 B1* | 10/2008 | Sobel | ............... | G06F 21/562 713/176 |
| 8,495,019 B2* | 7/2013 | Shisheng | ............... | G06F 11/004 707/639 |
| 8,843,444 B2* | 9/2014 | Palagummi | ............... | G06F 21/57 707/640 |
| 9,195,573 B1* | 11/2015 | Giammaria | ............... | G06F 11/3688 |

(Continued)

*Primary Examiner* — Oleg Korsak
(74) *Attorney, Agent, or Firm* — Dergosits & Noah LLP; Todd A. Noah

(57) ABSTRACT

Described is a system that leverages an isolated disaster recovery (or testing) environment to manage a range of cyber security threats associated with a virtual machine. The system may proactively manage such security threats by creating a second instance (e.g. replica) of a production virtual machine and verifying potential configuration updates that may be applied to the virtual machine to manage such security threats. The configuration updates may be verified by performing various tests on the second instance of the virtual that executes within the secure and isolated environment. Accordingly, the configuration updates may be verified without exposing the production environment to any potential risks. Thus, the system may proactively detect cyber security threats associated with a virtual machine and automatically initiate various corrective or preventative actions.

20 Claims, 4 Drawing Sheets

(56) References Cited

U.S. PATENT DOCUMENTS

| | | | |
|---|---|---|---|
| 10,284,593 B1* | 5/2019 | Panchanathan | G06F 11/1448 |
| 10,581,897 B1* | 3/2020 | Natanzon | G06F 21/568 |
| 10,944,778 B1* | 3/2021 | Golan | G06F 21/566 |

* cited by examiner

LEVERAGING A DISASTER RECOVERY INFRASTRUCTURE TO PROACTIVELY MANAGE CYBER SECURITY THREATS TO A PRODUCTION ENVIRONMENT

TECHNICAL FIELD

This disclosure relates to a system that manages cyber security threats, and more particularly, leveraging an isolated disaster recovery environment to manage cyber security threats associated with a production environment.

BACKGROUND

A data storage system may provide various backup and recovery tools that are crucial for enterprise level network clients. Customers may rely on backup systems to efficiently back up and recover data in the event of user error, data loss, system outages, hardware failure, or other catastrophic events to allow business applications to remain in service or quickly come back up to service after a failure event or an outage. As with all computing systems, backup systems must be concerned with various cyber security threats which may threaten production backup environments. Accordingly, various tools exist to detect and manage various security threats. However, performing various tests and verifications within a production environment may incur an unacceptable level of risk. For example, implementing configuration changes such as network settings within a production environment may expose the system to a new set risks. In addition, testing multiple configuration changes may be resource intensive, and thus, may be detriment the performance of a production system. Thus, there is a need to efficiently verify changes or updates that are to be implemented in response to various security threats without burdening and risking the security of a production backup system.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

DETAILED DESCRIPTION

Figure 1:
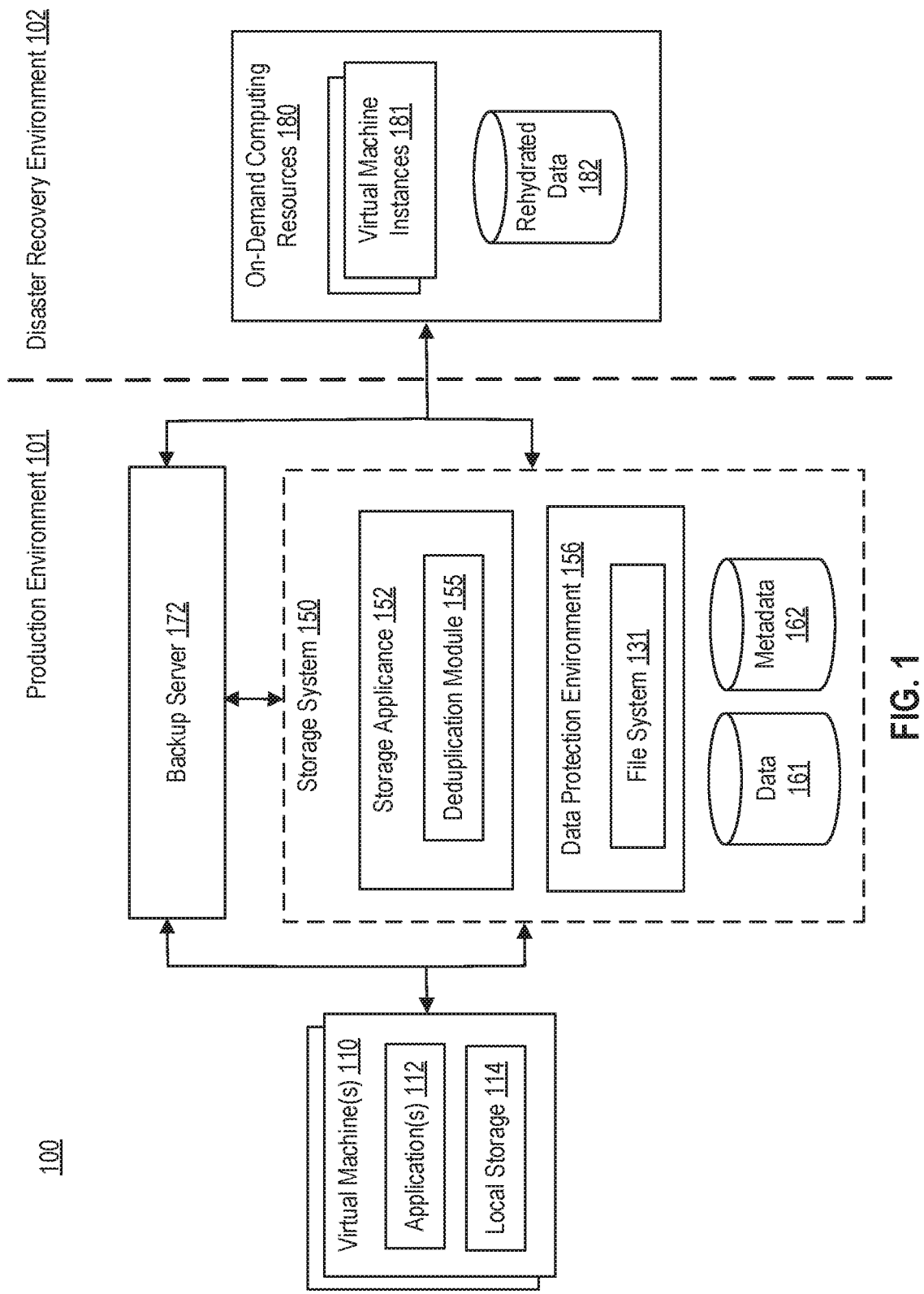
FIG. 1 is a block diagram illustrating an example of an operating environment for managing security threats according to one or more embodiments of the disclosure.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure. Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

In some embodiments, described is a system (and method) that leverages an isolated disaster recovery environment to manage a range of cyber security threats associated with a virtual machine (or other computer resource such as physical server) that executes within a production environment. The system, which may include a data storage system to which customers subscribe, may proactively manage security threats by verifying potential configuration updates that may be applied in response to various security threats. The configuration updates may be verified by performing a set of tests using a second instance of the virtual machine (e.g. replica virtual machine) that executes within a secure and isolated environment such as a service used for disaster recovery. For example, the second instance of the virtual machine may be part of a disaster recovery (e.g. failover) infrastructure that a customer may rely upon when there is a failure within a production environment. Accordingly, various potential configuration updates may be verified without exposing the production environment to additional risks. As a result, the system may proactively detect cyber security threats and automatically initiate various corrective or preventative actions.

Based on the type of security threat, the system may deploy one or more preventative actions. In one aspect, the preventative action may include the system applying a software update (e.g. a patch) to particular software components such as an application or operating system of the virtual machine. After verifying the software update, the system may apply the update to a production virtual machine (e.g. live virtual machine), or may apply the update to one or more backups of the virtual machines. For example, the system may apply the update to a previous backup of a virtual machine retroactively. Thus, when a client (e.g. customer) wishes to perform a restore operation for a virtual machine, the restored version of the virtual machine will include the configuration update required to protect against a particular security threat. Accordingly, the system may ensure that a restored virtual machine is not susceptible to security threats that are present after the backup operation was performed.

In another aspect, the preventative action may include the system applying specific settings to the virtual machine. For example, in the event a specific update (e.g. software patch) is not available for a cyber security threat, the system may test various network settings to limit access to the virtual machine to mitigate any potential risks. For example, the system may apply network settings such as restricting external network access to the virtual machine, or limiting access to specific IP addresses. In addition, in the event of a high security risk that cannot be mitigated, the system may even quarantine the virtual machine, for example, in response to unsuccessfully testing various configuration updates.

In some embodiments, to provide even a greater degree of flexibility to customers, the system may leverage a cloud-based infrastructure. For example, the system may be configured to deploy the disaster recovery environment within a pay-per-usage service in order to leverage the elasticity, scalability, and automated provisioning of the cloud-based infrastructure. Accordingly, the system may recreate virtual machines and rehydrate associated data within the disaster recovery environment only when needed to minimize the costs incurred by the customer for using computing resources.

In some embodiments, the system may manage cyber security threats associated with a system that performs backups of a production virtual machine. Accordingly, the system may detect a security threat associated with the virtual machine, which may include any range of cyber security threats including network and application vulnerabilities. As described, to proactively manage such security threats in a secure manner, the system may create a second instance of the virtual machine within a disaster recovery environment. In some embodiments, the system may recreate the virtual machine from data stored as part of a backup. For example, the backups of the virtual machine may be stored in a deduplicated manner, and accordingly, the system may recreate usable data by rehydrating data (e.g. decompress, decrypt, etc.) from a selected previous backup. The system may then tests various configuration updates to the second instance of the virtual machine. For example, the system may tests configuration updates such as a software patch or various settings such as network settings. Based on the results of these tests, the system may apply or deploy particular configuration updates to the production virtual machine and/or or backups of a virtual machine in a retroactive manner. Accordingly, various preventative measures may be verified within a secure and isolated environment before they are deployed in response to a detected or potential cyber security threat.

Such a system may be provided within an operating environment. An example of such an operating environment is further described herein with reference to FIG. 1. However, in general, embodiments of the disclosure may include and/or be implemented in an operating environment including a cloud services environment that may be, or include, a data protection operating environment that includes a storage environment including primary storage and data protection storage. For example, at least some functionality may be provided by, or implemented in connection with, various platforms such as the Dell/EMC Data Domain data protection platform, and associated systems, methods, and components, although use of this particular platform is provided only by way of illustration and is not required.

In one embodiment, the storage environment may take the form of a cloud storage environment. However, embodiments of the disclosure may also be implemented for an on-premises storage environment, and hybrid storage environments that include public and private elements, as well as any other type of storage environment. In addition, any of these cloud environments, or other operating environments, may take the form of an operating environment that is partly, or completely, virtualized. The storage environment may include one or more host devices that each host one or more applications used by a client of the storage environment. As such, a particular client may employ, or otherwise be associated with, one or more instances of each of one or more applications. In general, the applications employed by the clients are not limited to any particular functionality or type of functionality. Some example applications may include database applications (e.g. a SQL Server), filesystems, as well as data stores such as Oracle databases for example. The applications on the clients may generate new and/or modified data that is desired to be protected.

Any of the devices, including the clients, servers and hosts, in the operating environment can take the form of software, physical machines, or virtual machines (VM), or any combination thereof, though no particular device implementation or configuration is required for any embodiment. Similarly, data protection system components such as databases, storage servers, storage volumes, storage disks, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

More specifically, and with reference to FIG. 1, shown is a block diagram illustrating an example of an operating environment 100 for managing security threats for a production backup system according to one or more embodiments of the disclosure. As shown, the operating environment 100 may include a virtual machine(s) 110 that may be associated with a customer of a storage service and a storage system 150 that may be associated with a storage service provider. In addition, the customer may also be associated with a cloud-computing service used for disaster recovery (or other scenario). In some embodiments, the storage service provider and the cloud-computing service used for disaster recovery may be provided by different entities. It should be noted that the components of operating environment 100 may interact via a network, which may be any type of wired or wireless network including a local area network (LAN), a wide area network (WAN), or a direct communication link, or other suitable connection.

As shown, the environment 100 may include a production environment 101 and a disaster recovery environment 102. The production environment 101 may include components that are live and/or used for providing services by the customer of a data storage service. For example, the production environment 101 may include one or more virtual machines 110 that provide computing resources (e.g. webservers, databases, etc.) for customers (e.g. website visitors) for the customer of the data storage service. In some embodiments, these virtual machines may act as clients from which backups are performed.

The disaster recovery environment 102 may include an isolated and/or secure environment that is separate from the production environment 101. In some embodiments, the production environment may store one or more backups (e.g. primary or secondary backups) of the virtual machines 110. For example, the disaster recover environment 102 may be part of one or more physical servers that are provided as part of a cloud-computing service that is provided by a different entity than the entity that provides the production environment. For example, the production environment 101 may be provided as part of Dell/EMC Data Domain data protection platform and the disaster recovery environment 102 may be provided by a different entity (e.g. Amazon Web Services (AWS) platform, Microsoft Azure platform, etc.). Accordingly, in some embodiments, the disaster recovery environment 102 may be provided as part of a user-account managed by the different entity (e.g. Amazon, Microsoft, etc.) and associated with the customer of the virtual machines 110. Accordingly, the system described herein may provide the customer with the ability to efficiently and seamlessly interact with the different entity that provides the cloud-infrastructure for the disaster recovery environment 102. The cloud infrastructure may include one or more on-demand computing resources 180 for one or more instances of the virtual machines 181 as further described herein. The on-demand computing resources 180 may also include a data storage for rehydrated data 182 that is created from data that is stored by the storage system 150.

In one embodiment, storage system 150 may represent one or more components of a Data Domain™ Restorer (DDR)-based deduplication storage system, and backup server 172 may be implemented together with a Data Domain deduplication storage server provided by Dell/EMC™ Corporation for use with DDR storage devices. However, other similar backup and storage systems are also possible. Storage system 150 may utilize certain protocol-specific namespaces that are the external interface to applications and include NFS (network file system) and CIFS (common internet file system) namespaces, as well as DD Boost provided by Dell/EMC Corporation. In general, DD Boost (Data Domain Boost) is a system that distributes parts of the deduplication process to the backup server or application clients, enabling client-side deduplication for faster, more efficient backup and recovery. A data storage deployment may use any combination of these interfaces simultaneously to store and access data. Data Domain (DD) devices in system 100 may use the DD Boost backup protocol (e.g. file-oriented access protocol) to provide access from servers to DD devices. The DD Boost library exposes APIs (application programming interfaces) to integrate with a Data Domain system using an optimized transport mechanism. These API interfaces exported by the DD Boost Library provide mechanisms to access or manipulate the functionality of a Data Domain file system. For example, the DD Boost protocol or API may be an example of a file-oriented access interface (or protocol). For instance, the DD Boost protocol may create metadata information related to backup functions (e.g. metadata related to backup type, identifiers, etc.).

As shown, the system may include a virtual machine(s) 110. In general, the virtual machine 110 is a virtualization of underlying hardware and/or software and, as such, may include or otherwise be associated with various underlying components. Virtual Machine 110 may host one or more applications 112, and may include local storage 114, as well as an interface for communicating with other systems and devices, such as the storage system 150. Accordingly, the virtual machine 110 may act as a client. In general, the applications 112 may create new and/or modified data that is desired to be protected. As such, the virtual machine 110 is an example of a host device. The local storage 114 can be used to locally store data, which may, along with the virtual machine itself be backed up using the storage system 150. The backup data can be restored to the local storage 114. The client 110 may include a backup client application that cooperates with storage system 150, to create backups of client data, which may include data 161. As used herein, the term "data" is intended to be broad in scope. Accordingly, data may include data objects (or objects) as further described herein, data segments such as may be produced by data stream segmentation processes, data chunks, data blocks, atomic data, emails, files, contacts, directories, subdirectories, volumes, etc.

The storage system 150, may include a storage appliance 152 in some embodiments. Accordingly, backup data may be communicated from the virtual machine 110 to the storage appliance 152 for initial processing, after which the processed backup data is uploaded from the storage appliance 152 for storage at the data protection environment 156. For example, a backup application may cooperate with a backup client application of the virtual machine 110 to back up client data to the data protection environment 156. A backup application may also cooperate with a backup client application to restore backed up data from the data protection environment 156 to the virtual machine 110. The storage appliance 152 may provide a variety of useful functionalities such as source-side data deduplication, data compression, and WAN optimization boost performance and throughput while also possibly reducing the consumption and cost of network bandwidth and cloud storage capacity. One, some, or all, of these functions of the storage appliance 152 can be performed using deduplication logic via deduplication module 155. For example, the deduplication module 155 can provide data segmentation, as well as in-flight encryption as the data is sent by the storage appliance 152 to the data protection environment 156.

The data protection environment 156 may store metadata 162 for the data 161 and include one or more instances of a filesystem 131 that catalogues files and other data residing in the data protection environment 156. In general, the storage of data 161 may be configured to store client data backups that can be restored in the event of a loss of data. The term data backups is intended to be construed broadly and includes, but is not limited to, partial backups, incremental backups, full backups, clones, snapshots, any other type of copies of data, and any combination of the foregoing. Any of the foregoing may, or may not, be deduplicated. The storage of data can employ any suitable storage technique, infrastructure, hardware (e.g. Solid State Drive (SSD), Hard Disk Drive (HDD)), or on virtual storage systems provided by a cloud service provider etc.

Figure 2:
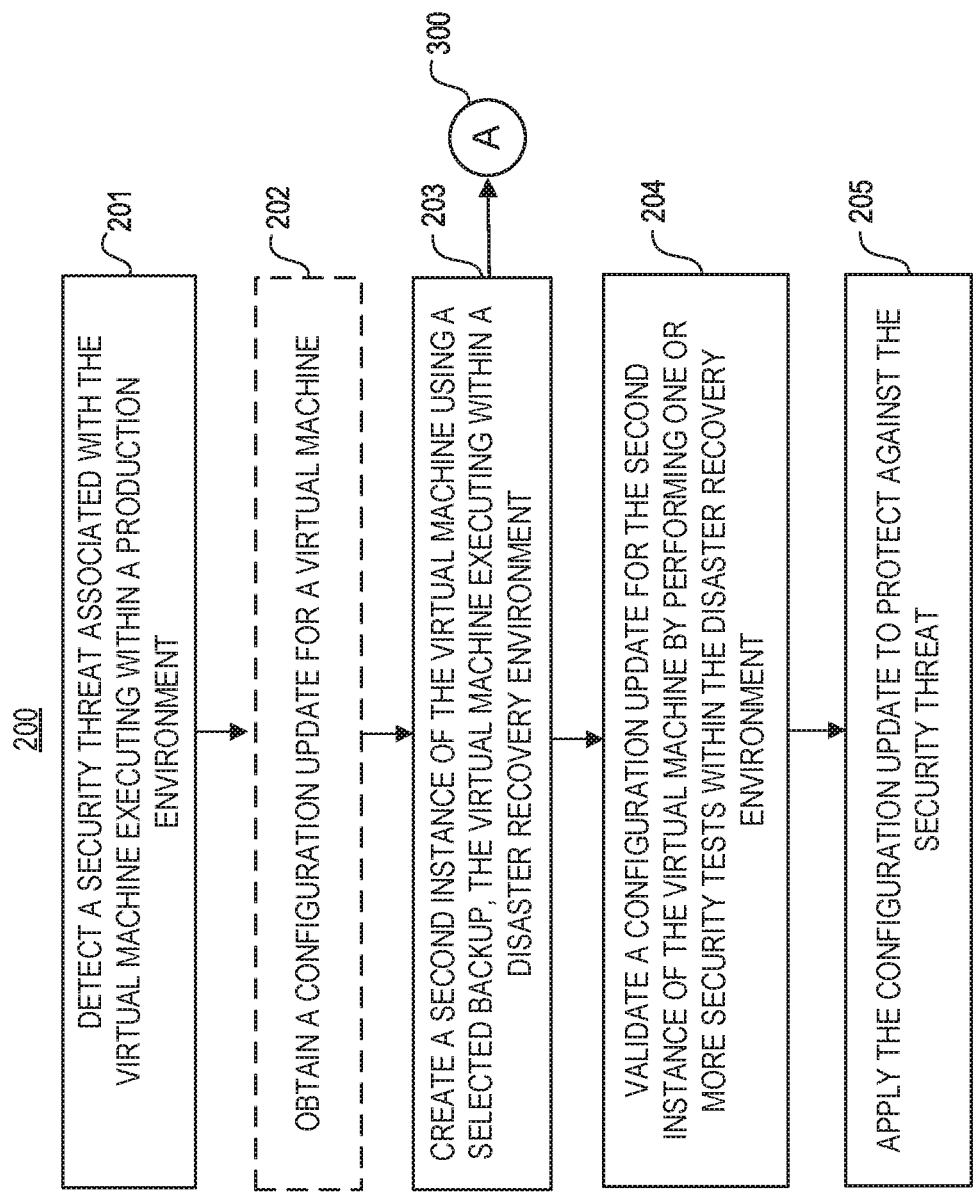
FIG. 2 is a flow diagram illustrating an example method of managing security threats by leveraging a cloud-based disaster recovery environment according to one or more embodiments of the disclosure.

FIG. 2 is a flow diagram illustrating an example method of managing security threats by leveraging a cloud-based disaster recovery environment according to one or more embodiments of the disclosure. Process 200 (and related process/sub-process 300) may use processing logic, which may include software, hardware, or a combination thereof. For example, processes 200 and 300 may be performed by a system including one or more components described in operating environment 100 (e.g. storage system 150).

In 201, the system may detect a security threat associated with a virtual machine (e.g. virtual machine 110). In one embodiment, the security threat may be associated with the virtual machine executing within a production environment (e.g. production environment 101). As described, the virtual machine may be associated with a data storage service including a disaster recover service, and accordingly, a plurality of backups of the virtual machine may be stored within a data storage (e.g. data protection environment 156). The plurality of backups may include a current backup (e.g. most recent backup) and a plurality of previous backups of the virtual machine. As described, the backup data may be stored as data chunks. In addition, the backup data may be stored in an deduplicated manner. In some embodiments, these backups may be created by the data storage system as part of a scheduled backup routine (e.g. daily).

The security threat may include any range of cyber security threats including network and application vulnerabilities. For example, the threat may include a virus, malware, or other malicious code. As another example, the threat may include an injection flaw that may include security vulnerabilities that allows a user to "break out" of the web application context. For example, if a web application takes user input and inserts that user input into a back-end database, shell command, or operating system call, that application may be susceptible to an injection flaw. The threat may also include malicious file execution vulnerabilities (or File Inclusion Vulnerabilities) that occur due to user input or uploads to a website not being properly handled or poor data validation by the website/web application that comprise an underlying server. As another example, the threat may include insecure direct object reference, which may include instances where an application exposes reference to an internal implementation object. As yet another example, the security threat may be related authentication session management such a preventing a broken authentication session. Other threats may include an advanced persistent threat (APT). For example, an APT threat may include a stealth computer network attack in which a person or group gains unauthorized access to a network and remains undetected for an extended period. It should be noted that the threats noted above are merely examples and that various other cyber security threats that would be known to expose a production system (e.g. virtual machine or physical server) to risks are also contemplated.

In 202, the system may obtain a configuration update. In some embodiments, the configuration update may include a software update (e.g. a patch) for a particular software component such as an application or operating system of the virtual machine. For example, the software update may be received and/or issued by a provider of the particular software component. As another example, the configuration update may include information regarding a potential security threat and instructions for addressing such a threat. For example, the system may provide a cyber security threat monitoring service that may predict a potential risk based on gathered information (e.g. usage statistics). Accordingly, the system may obtain information for various settings that may need to be implemented to protect against a particular risk.

In 203, the system may create a second instance of the virtual machine within a disaster recovery environment from a selected backup. The second instance of the virtual machine may include a replica, copy, or other type of virtual machine that effectively recreates one or more production virtual machines for testing purposes. In one embodiment, the production machine may be a physical computing device (e.g. server) and the second instance may be created as a virtual machine. In some embodiments, when creating the virtual machine, a particular backup may be selected from amongst the plurality of backups to be used as a data source. The selected backup may include the current backup or a previous backup. For example, the detected security threat may be associated with the virtual machine of the production environment, and accordingly, the system may create the second instance of the virtual machine from the current (e.g. most recent) backup. In addition, the system may also obtain the same or different configuration update for one or more previous backups to ensure the update is provided to previous backup versions that may be restored. For example, the system may determine the configuration update (e.g. software patch, or configuration settings) may not be available (or effective) for the production virtual machine. Accordingly, the system may have to resort to attempting to provide the configuration update to a previous version of the virtual machine, which may be restored as part of the response to the security threat or breach. In one embodiment, the system may create the second instance of the virtual machine only in response to the detection of the security threat. For example, because the computing resources required to create the disaster recovery environment may be based on a cloud-service that is pay-per-usage, the system may only reserve (e.g. instantiate) the second instance of the virtual machine in response to detection of a particular security threat. Similarly, the system may only initiate rehydrating data from the data storage when necessary as part of a response to security threat, which may include a preventative and proactive response. For example, resources to store the decompressed data (e.g. cloud storage) may only be reserved as necessary. Generally, the system may perform a processing to provide the necessary data to the on-demand computing resources. For example, the system may read data from the data storage to be used when creating the second instance of the virtual machine. In one embodiment, creating the second instance of the virtual machine may include one or more additional processes (or sub-processes) 300 as shown in FIG. 3.

Figure 3:
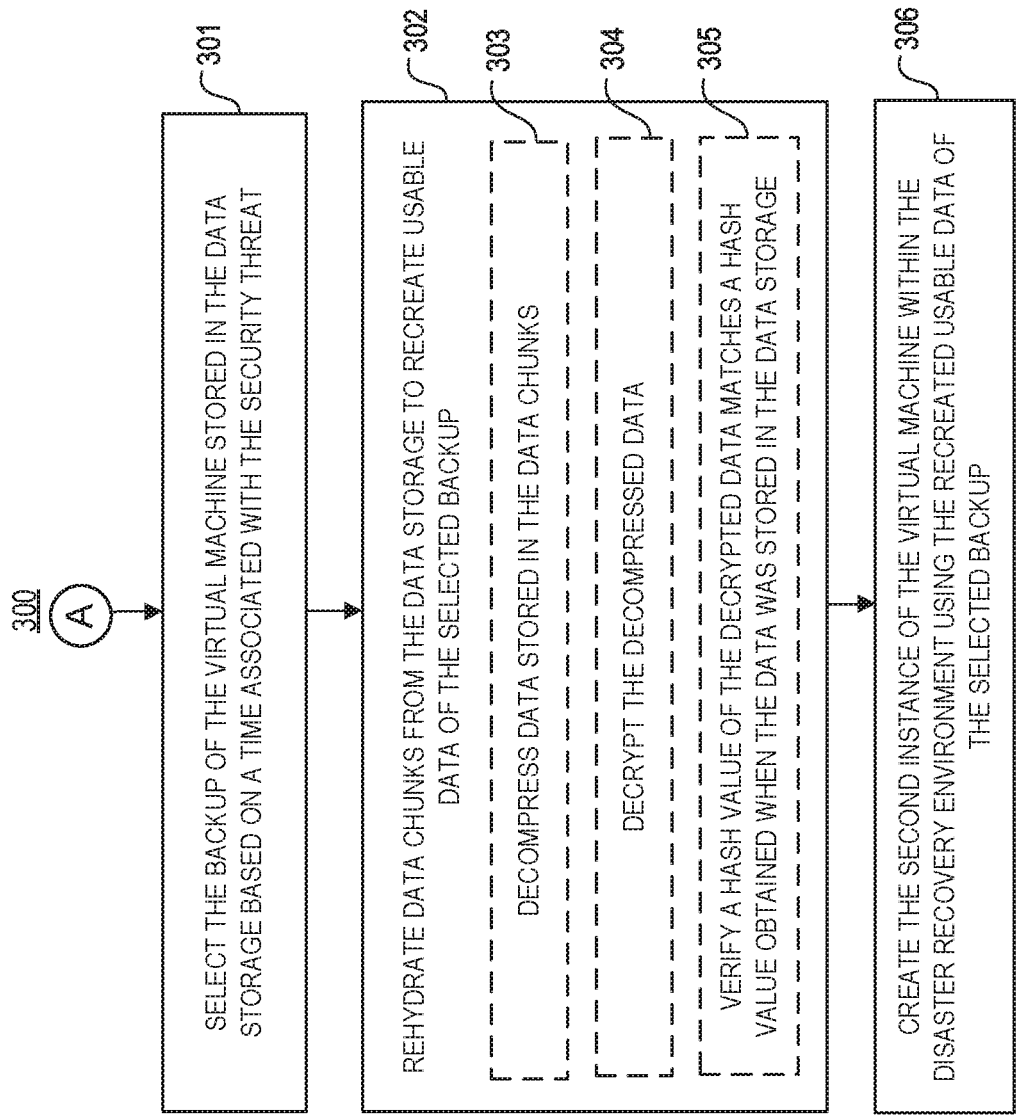
FIG. 3 is a flow diagram illustrating an example method of creating an additional instance of a virtual machine within a disaster recovery environment according to one or more embodiments of the disclosure.

FIG. 3 is a flow diagram illustrating an example method of creating an additional instance of a virtual machine within a disaster recovery environment according to one or more embodiments of the disclosure. In 301, the system may select the backup of the virtual machine stored in the data storage to be used to create a second instance of a virtual machine based on a time associated with the security threat. In one embodiment, the backup may be selected based on a backup date associated with the selected backup being prior to a date associated with the security threat. For example, if the system determines that a particular backup version may be susceptible to a security threat, only those backups preceding such a date may be selected, for example, as part of a roll-back restore process. In addition, if the system determines a security threat effects only configurations after a particular date, only those backups that were performed after the particular data may be selected. In addition, in some embodiments, the system may iteratively attempt various configuration updates on a set of backups. For example, the system may create virtual machines from a sequence of backups to determine (or identify) a backup that is not susceptible to a particular security threat.

In 302, the system may rehydrate data chunks from the data storage to recreate usable data of the selected previous backup. As described, data stored in the data storage may be stored in an efficient manner (e.g. deduplicated). Accordingly, the system may be required to reverse such a process (e.g. rehydrate) the data that is stored in the data storage. As referred to herein, rehydrating data may include performing a process to create usable data (e.g. decompressed, decrypted, etc.). For example, in one embodiment, the rehydration may include one or more sub-processes. For example, in 303, the system may decompress data stored in the data chunks, and in 304, the system may decrypt the decompressed data to reconstruct the data. In addition, as part of the rehydration process, the system may verify the rehydrated data. For example, in 305, the system may verify a hash value of the decrypted data matches a hash value obtained when the data was stored in the data storage. Accordingly, in 306, the system may create the second instance of the virtual machine within the disaster recovery environment using the recreated usable data of the selected previous backup.

Now referring back to FIG. 2, once the second instance of the virtual machine has been created, in 204, the system may validate (or verify) a configuration update to the second instance of the virtual machine. The configuration update may be provided in response to the security threat to counteract and/or lessen the potential vulnerabilities that may be associated with the security threat. In some embodiments, the system may automatically perform security threat testing using the second instance of the virtual machine without necessarily requiring direct input or oversight by an administrator of the production environment.

In one embodiment, the system may validate the configuration update by performing one or more security tests associated with the second instance of the virtual machine that may be executing within the disaster recovery environment. The security tests may include tests related to a live or production environment and/or one or more backups. For example, the system may perform tests on a second instance of a virtual machine that is based on the most recent (e.g. current) backup of the production virtual machine. For example, the system may determine the configuration update is valid based on the most recent backup of the virtual machine, and accordingly, may be suitable for deployment to the production environment. Accordingly, tests on a configuration update may be performed with the intention of deploying the configuration update to the production virtual machine. In addition, the tests on the configuration update may be performed on virtual machines created from one or more previous backups of the virtual machine in order to retroactively provide protection in the event the virtual machine may need to be rolled back (e.g. restored from a previous backup).

As described, the configuration update may include any changes to the functioning of a virtual machine (e.g. changes to code, settings, operating system, platform, etc.). In one embodiment, the configuration update may include a software update for the virtual machine. Accordingly, the one or more security tests associated with the second instance of the virtual machine may include verifying an installation of the software update prevents one or more vulnerabilities associated with the security threat. For example, the testing may include an verifying an operating system update functions correctly before applying it to the production virtual machine. As another example, a software patch to protect against a virus may first be tested on an application running with the second instance of the virtual machine before applying it to application within the production environment.

In one embodiment, the configuration update may include an update to settings of a virtual machine. For example, the setting may include one or more network settings. For example, in the event a specific update (e.g. software patch) is not available for a cyber security threat, the system may test various network settings to limit access to the virtual machine to mitigate any potential risks. For example, the system may apply network settings such as restricting external network access to the virtual machine, or limiting access to specific IP addresses. In addition, in the event of a high security risk that cannot be mitigated, system may even quarantine the virtual machine, for example, in response to unsuccessfully testing various configuration updates in response to a particular cyber security threat.

Accordingly, the one or more security tests associated with the second instance of the virtual machine may include verifying the one or more network settings prevents one or more vulnerabilities associated with the security threat.

In 205, the system may apply or deploy the configuration update to protect against the detected security threat. As described, the system may apply the configuration update to various versions of the virtual machine including a live virtual machine that is executing in the production environment. For example, to provide immediate protection for any security threats, the configuration update may be deployed directly to the virtual machine within the production environment. In one embodiment, the system may initiate the deployment. For example, if the configuration update was obtained by a third-party such as a software update from the provider of a software component, the system may initiate the installation of the software update to the production virtual machine. In some embodiments, the system may deploy the configuration update to the production virtual machine automatically, for example, without necessarily receiving assistance form an administrator of the production virtual machine. Accordingly, in response to validating the configuration update, the system may automatically apply the configuration update to the virtual machine executing within production environment.

In addition, the configuration update may also be applied to one of the backups of the virtual machine stored by the storage system. For example, the system may apply the configuration update retroactively to a previous backup. In one embodiment, the system may restore, in response to the detected security threat, the virtual machine executing within the production environment with the selected backup including the retroactive configuration update. For example, the selected backup may include a backup that was created prior the detected security threat. In addition, in some embodiments, the system may notify the administrator of the production environment of potential threats and may provide a series of corrective options that may be undertaken. In addition, the system may automatically perform various countermeasure (e.g. automatically deploy a software update or automatically change network settings).

Figure 4:
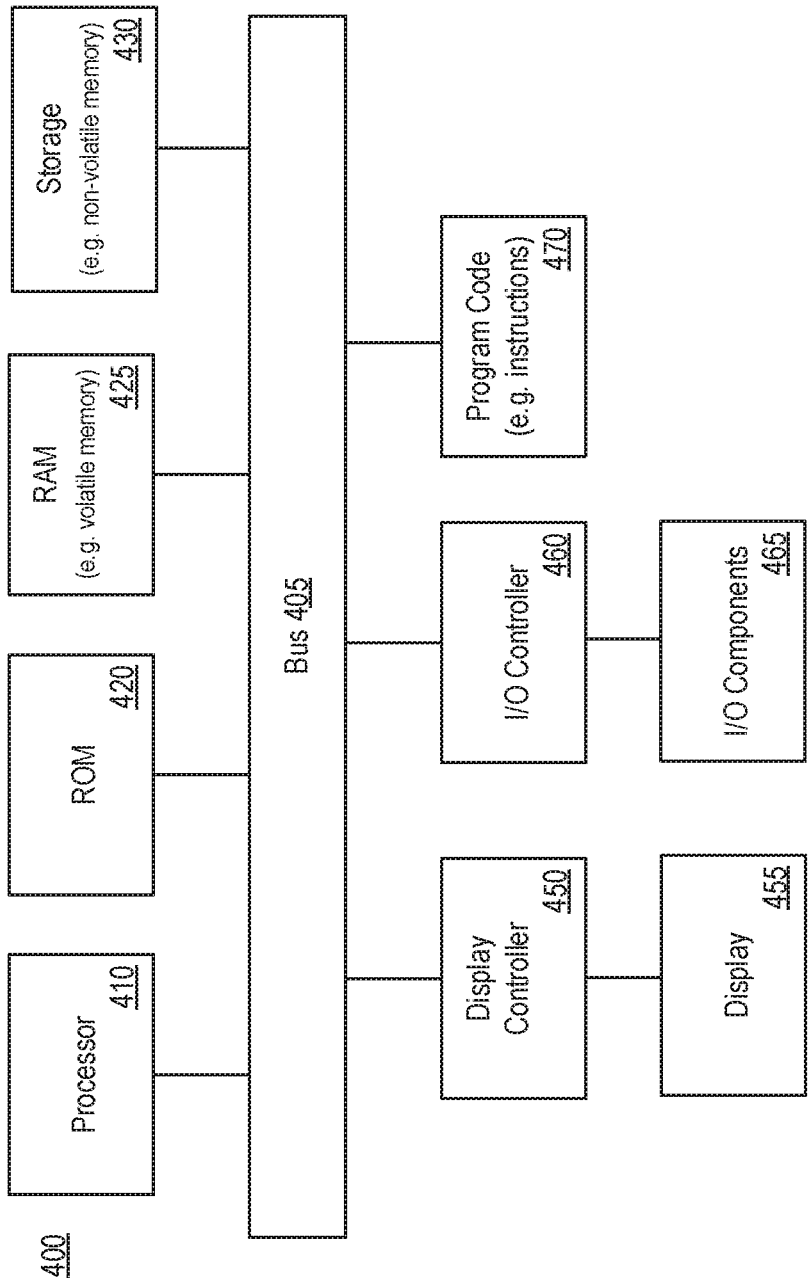
FIG. 4 is a block diagram illustrating an example of a computing system that may be used in conjunction with one or more embodiments of the disclosure.

FIG. 4 shows a block diagram of an example of a computing system that may be used in conjunction with one or more embodiments. For example, computing system 400 (or system, or server, or computing device, or device) may represent any of the devices or systems (e.g. storage system 150, or virtual machine 110, etc.) described herein that perform any of the processes, operations, or methods of the disclosure. Note that while the computing system 400 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 400 may include a bus 405 which may be coupled to a processor 410, ROM (Read Only Memory) 420, RAM (or volatile memory) 425, and storage (or non-volatile memory) 430. The processor 410 may retrieve stored instructions from one or more of the memories 420, 425, and 430 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein. The RAM 425 may be implemented as, for example, dynamic RAM (DRAM), or other types of memory that require power continually in order to refresh or maintain the data in the memory. Storage 430 may include, for example, magnetic, semiconductor, tape, optical, removable, non-removable, and other types of storage that maintain data even after power is removed from the system. It should be appreciated that storage 430 may be remote from the system (e.g. accessible via a network).

A display controller 450 may be coupled to the bus 405 in order to receive display data to be displayed on a display device 455, which can display any one of the user interface features or embodiments described herein and may be a local or a remote display device. The computing system 400 may also include one or more input/output (I/O) components 465 including mice, keyboards, touch screen, network interfaces, printers, speakers, and other devices. Typically, the input/output components 465 are coupled to the system through an input/output controller 460.

Program code 470 may represent any of the instructions, applications, software, libraries, toolkits, modules, components, engines, units, functions, logic, etc. as described herein. Program code 470 may reside, completely or at least partially, within the memories described herein (e.g. non-transitory computer-readable media), or within a processor during execution thereof by the computing system. Program code 470 may include both machine code, such as produced by a compiler, and files containing higher-level or intermediate code that may be executed by a computing system or other data processing apparatus (or machine) using an interpreter. In addition, program code 470 can be implemented as software, firmware, or functional circuitry within the computing system, or as combinations thereof. Program code 470 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that the term "approximately" or "substantially" may be used herein and may be interpreted as "as nearly as practicable," "within technical limitations," and the like. In addition, the use of the term "or" indicates an inclusive or (e.g. and/or) unless otherwise specified.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A system comprising:
one or more processors; and
a non-transitory computer readable medium storing a plurality of instructions, which when executed, cause the one or more processors to:
detect a security threat associated with a virtual machine executing within a production environment, a plurality of backups of the virtual machine stored within one or more data chunks of a data storage;
create, in response to the detection of the security threat, a second instance of the virtual machine using a selected backup from amongst the plurality of backups, the second instance of the virtual machine executing within a disaster recovery environment;
validate a configuration update for the second instance of the virtual machine by performing one or more security tests within the disaster recovery environment, the configuration update provided in response to the security threat; and
apply the configuration update to the virtual machine executing within the production environment in response to validating the configuration update for the second instance of the virtual machine.

2. The system of claim 1, wherein the selected backup is selected based on a backup date associated with the selected backup being prior to a date associated with the security threat.

3. The system of claim 1, wherein the plurality of instructions, when executed, further cause the one or more processors to:
apply the configuration update retroactively to the selected backup in response to validating the configuration update; and
restore, in response to the detected security threat, the virtual machine executing within the production environment with the selected backup including the retroactive configuration update.

4. The system of claim 1, wherein creating the second instance of the virtual machine within a disaster recovery environment from the selected previous backup comprises:
rehydrating at least some of the one or more data chunks from the data storage to recreate usable data of the selected backup of the virtual machine; and
creating the second instance of the virtual machine within the disaster recovery environment using the recreated usable data of the selected backup.

5. The system of claim 4, wherein rehydrating at least some of the one or more data chunks from the data storage comprises:
decompressing data stored in the data chunks;
decrypting the decompressed data; and
verifying a hash value of the decrypted data matches a hash value obtained when the data was stored in the data storage.

6. The system of claim 1, wherein the plurality of instructions, when executed, further cause the one or more processors to:
obtain a software update from a third-party provider as the configuration update, wherein performing the one or more security tests associated with the second instance of the virtual machine includes verifying an installation of the software update on the second instance of the virtual machine prevents one or more vulnerabilities associated with the security threat.

7. The system of claim 1, wherein the configuration update comprises one or more network settings, and wherein performing the one or more security tests associated with the second instance of the virtual machine includes verifying that restricting access to the second instance of the virtual machine using the one or more network settings prevents one or more vulnerabilities associated with the security threat.

8. A method comprising:
detecting a security threat associated with a virtual machine executing within a production environment, a plurality of backups of the virtual machine stored within one or more data chunks of a data storage;
creating, in response to the detection of the security threat, a second instance of the virtual machine using a selected backup from amongst the plurality of backups, the second instance of the virtual machine executing within a disaster recovery environment;

validating a configuration update for the second instance of the virtual machine by performing one or more security tests within the disaster recovery environment, the configuration update provided in response to the security threat; and applying the configuration update to the virtual machine executing within the production environment in response to validating the configuration update for the second instance of the virtual machine.

9. The method of claim 8, wherein the selected backup is selected based on a backup date associated with the selected backup being prior to a date associated with the security threat.

10. The method of claim 8, further comprising:

applying the configuration update retroactively to the selected backup in response to validating the configuration update; and restoring, in response to the detected security threat, the virtual machine executing within the production environment with the selected backup including the retroactive configuration update.

11. The method of claim 8, wherein creating the second instance of the virtual machine within a disaster recovery environment from the selected previous backup comprises:

rehydrating at least some of the one or more data chunks from the data storage to recreate usable data of the selected backup of the virtual machine; and creating the second instance of the virtual machine within the disaster recovery environment using the recreated usable data of the selected backup.

12. The method of claim 11, wherein rehydrating at least some of the one or more data chunks from the data storage comprises:

decompressing data stored in the data chunks;

decrypting the decompressed data; and verifying a hash value of the decrypted data matches a hash value obtained when the data was stored in the data storage.

13. The method of claim 8, further comprising:

obtaining a software update from a third-party provider as the configuration update, wherein performing the one or more security tests associated with the second instance of the virtual machine includes verifying an installation of the software update on the second instance of the virtual machine prevents one or more vulnerabilities associated with the security threat.

14. The method of claim 8, wherein the configuration update comprises one or more network settings, and wherein performing the one or more security tests associated with the second instance of the virtual machine includes verifying that restricting access to the second instance of the virtual machine using the one or more network settings prevents one or more vulnerabilities associated with the security threat.

15. A computer program product comprising a non-transitory computer-readable medium having a computer-readable program code embodied therein to be executed by one or more processors, the program code including instructions to:

detect a security threat associated with a virtual machine executing within a production environment, a plurality of backups of the virtual machine stored within one or more data chunks of a data storage;

create, in response to the detection of the security threat, a second instance of the virtual machine using a selected backup from amongst the plurality of backups, the second instance of the virtual machine executing within a disaster recovery environment;

validate a configuration update for the second instance of the virtual machine by performing one or more security tests within the disaster recovery environment, the configuration update provided in response to the security threat; and apply the configuration update to the virtual machine executing within the production environment in response to validating the configuration update for the second instance of the virtual machine.

16. The computer program product of claim 15, wherein the selected backup is selected based on a backup date associated with the selected backup being prior to a date associated with the security threat.

17. The computer program product of claim 15, wherein the program code includes further instructions to:

apply the configuration update retroactively to the selected backup in response to validating the configuration update; and restore, in response to the detected security threat, the virtual machine executing within the production environment with the selected backup including the retroactive configuration update.

18. The computer program product of claim 15, wherein creating the second instance of the virtual machine within a disaster recovery environment from the selected previous backup comprises:

rehydrating at least some of the one or more data chunks from the data storage to recreate usable data of the selected backup of the virtual machine; and creating the second instance of the virtual machine within the disaster recovery environment using the recreated usable data of the selected backup.

19. The computer program product of claim 18, wherein rehydrating at least some of the one or more data chunks from the data storage comprises:

decompressing data stored in the data chunks;

decrypting the decompressed data; and verifying a hash value of the decrypted data matches a hash value obtained when the data was stored in the data storage.

20. The computer program product of claim 15, wherein the program code includes further instructions to:

obtain a software update from a third-party provider as the configuration update, wherein performing the one or more security tests associated with the second instance of the virtual machine includes verifying an installation of the software update on the second instance of the virtual machine prevents one or more vulnerabilities associated with the security threat.

* * * * *